March 18, 1958  J. E. HUBER  2,826,974
ADJUSTABLE MOUNT FOR SIGHT UNIT AND CAMERA
Filed April 9, 1956  4 Sheets-Sheet 1

INVENTOR.
JOHN E. HUBER.
BY
Joseph B. Lindecker
ATT'Y.

March 18, 1958  J. E. HUBER  2,826,974
ADJUSTABLE MOUNT FOR SIGHT UNIT AND CAMERA
Filed April 9, 1956  4 Sheets-Sheet 2
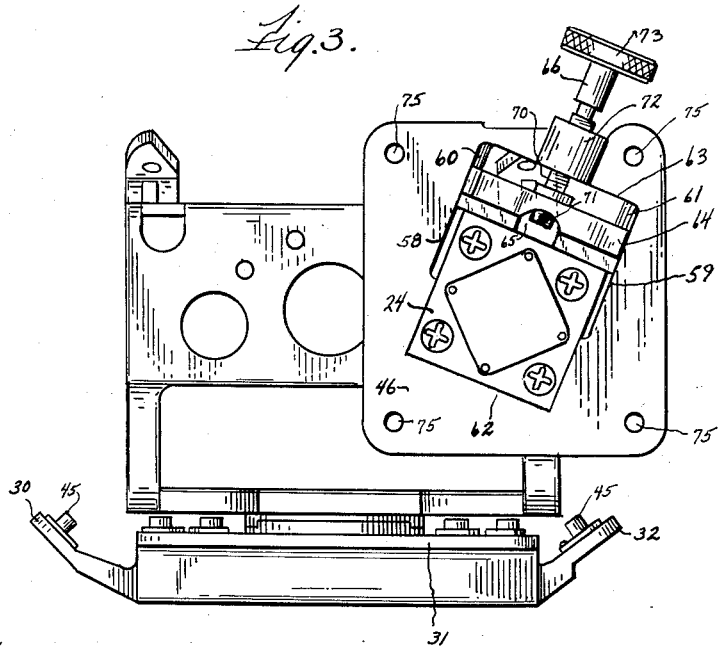

March 18, 1958 J. E. HUBER 2,826,974
ADJUSTABLE MOUNT FOR SIGHT UNIT AND CAMERA

Filed April 9, 1956 4 Sheets-Sheet 3

INVENTOR.
JOHN E. HUBER.
BY Joseph B. Lindecker
ATT'Y.

March 18, 1958  J. E. HUBER  2,826,974
ADJUSTABLE MOUNT FOR SIGHT UNIT AND CAMERA
Filed April 9, 1956  4 Sheets-Sheet 4

INVENTOR.
JOHN E. HUBER.
BY
Joseph B. Lindecker
ATT'Y.

United States Patent Office 2,826,974
Patented Mar. 18, 1958

2,826,974
ADJUSTABLE MOUNT FOR SIGHT UNIT AND CAMERA

John E. Huber, Delhi Township, Hamilton County, Ohio, assignor to Huber Industries, Inc., Cincinnati, Ohio, a corporation of Ohio Application April 9, 1956, Serial No. 576,884

9 Claims. (Cl. 95—12)

This invention relates to aircraft-instrument mounts, and the primary object is the provision of a mount of this character which will support a gun sight and/or bomb sight in juxtaposition with a motion picture camera upon any desired surface of an aircraft.

The invention is not necessarily limited to the direction of bullet-type projectiles as such, but suitable also for the direction of rockets and other missiles; therefore, the term gun sight and/or bomb sight as used herein should be considered broadly throughout this application.

It is, therefore, an object of this invention to provide means for suitably mounting a gun sight and a photographic camera, side by side, upon an aircraft where extreme limitation of space is of paramount importance.

It is a further object of the invention to provide a mount constructed of suitable material providing sufficient rigidity to withstand the tremendous impact loads and vibrations to which aircraft instruments are subjected.

Another object of the invention is to provide a gun sight mount embodying a vertically positioned bolt which can be inserted into the base of a gun sight and/or bomb sight to rigidly secure same in place to withstand any and all impact loads subjected therewith.

Another and further object of the invention is to provide means for the coincidental mounting of an aircraft gun sight and a motion picture camera intended to record the reticules of the sight as well as the target upon which the aircraft is sighted, said mounting providing the location of said camera with reference to said sight and the line of sight of the aircraft so as to preclude the necessity for having to adjust said camera independently of said sight after installation.

A still further object of the invention is the provision of an aircraft sight and camera mount which can be located and so oriented as to permit the pilot, using but one hand, to remove the camera assembled adjacent a gun sight and restore it to its position adjacent said sight on said mount after he has made any desired adjustments to the gun sight, and/or bomb sight, which he finds necessary during flight.

A still further object of the invention is to provide an aircraft sight and camera mount provided with various holes not needed for the passage of bolts, screws, etc., but to reduce the weight of the mount while, at the same time, not materially reduce its strength or rigidity.

A still further object of the invention is to provide an aircraft-instrument mount which will not only secure and support a sight and a camera in any desired position, but will also provide a mount with a bracket embodying stabilizing tabs to give additional support to said sight, and/or camera; said tabs being bolted to the upper portion of said sight, forming a wrap-around type of support.

A still further object of the invention is to provide an aircraft-instrument mount which will not only support a sight and a camera in a desired position, but will also provide a mounting embodying additional bracing and attachment portions which will provide a certain measure of reinforcement for the aircraft structure to which it is to be attached.

Other objects and advantages of the invention, together with novel features of construction and operation thereof, will appear from the following description when read in the light of the accompanying drawings, in which:

Figure 3 is an end elevational view, as observed by a pilot, of the sight mount illustrated in Figures 1 and 2;

Figure 4 is a top plan view of the sight mount illustrated in Figures 1, 2 and 3;

Figure 1:
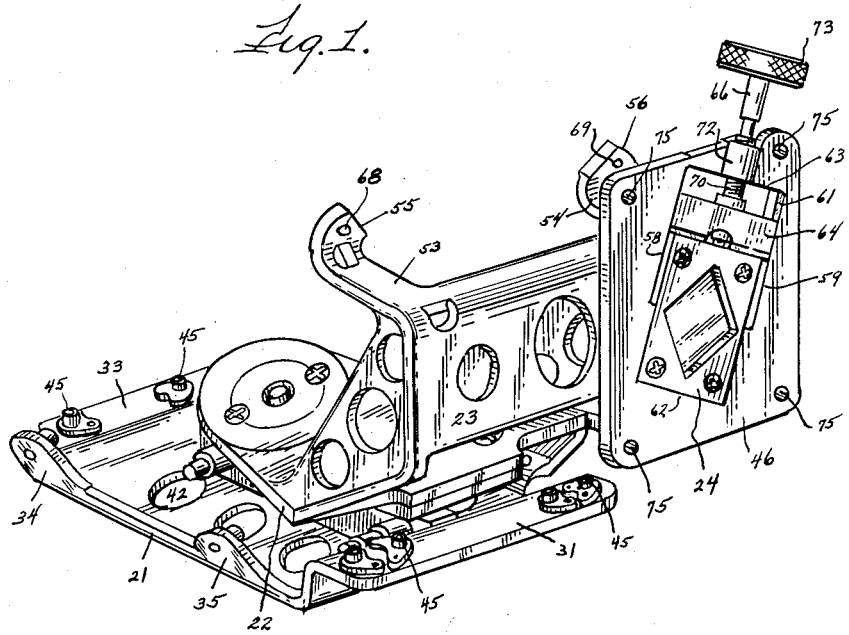
Figure 1 is a perspective view of a sight mount constructed in accordance with and embodying a preferred form of my invention, the camera-mounting plate and adaptor plate shown in position upon the sight mount.

In the illustrated embodiment, the sight mount of the present invention is shown as having six major sections, i. e., an aircraft attachment plate 21 having side and base portions for fitting same to a desirable surface of an airplane; a gun sight bracket 22 having means assembled therewith for changing and adjusting the position thereof; a substantially vertical frame portion 23 having its lower portion integral with said gun sight bracket 22; a camera mounting plate 24; a quickly detachable camera adaptor plate 46 embodying a pair of side guide portions, a fixed and movable jaw and means for operating said movable jaw; and rockers with associated parts to provide the azimuth and elevation adjustment locking system.

Figure 5:
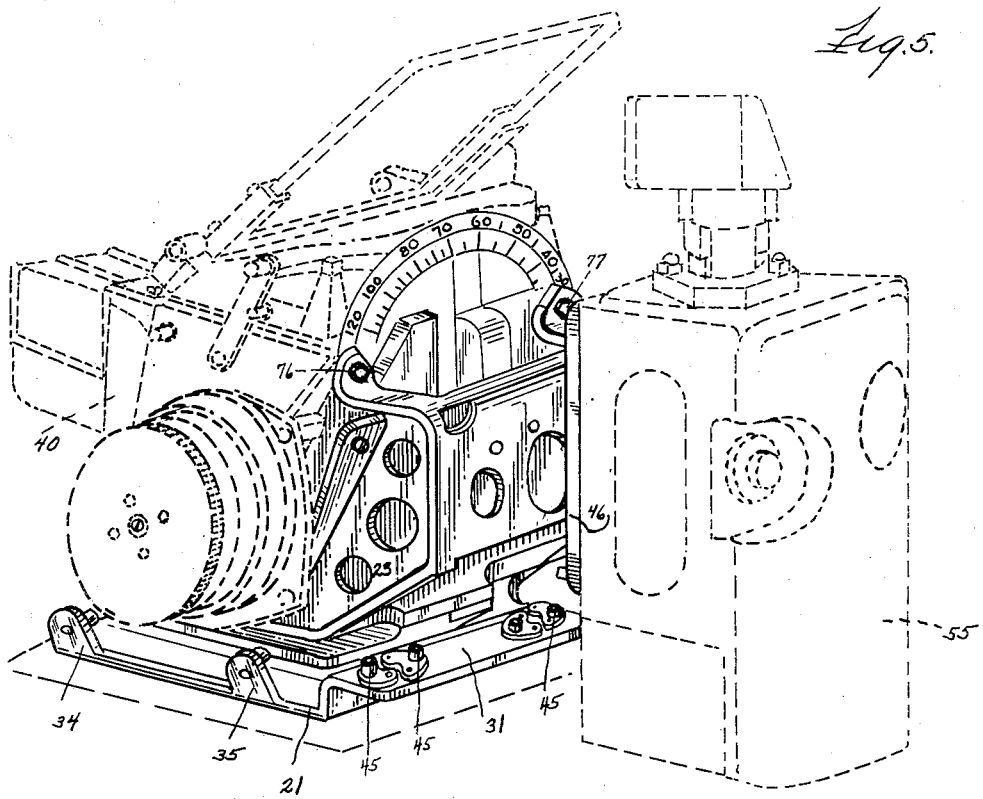
Figure 5 is a perspective view of the sight mount as illustrated in Figure 1, with a gun sight and a camera illustrated dotted and assembled upon said sight mount.
Figure 7:
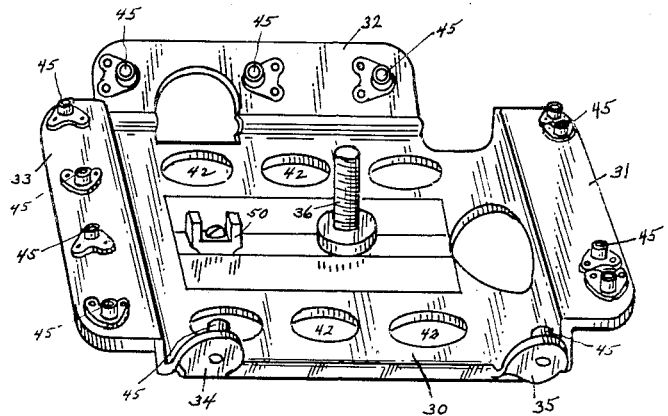
Figure 7 is a top perspective view of the aircraft attachment plate of the sight mount illustrated in Figures 1, 2, 3, 4 and 5, said plate removed from said sight mount.
Figure 8:
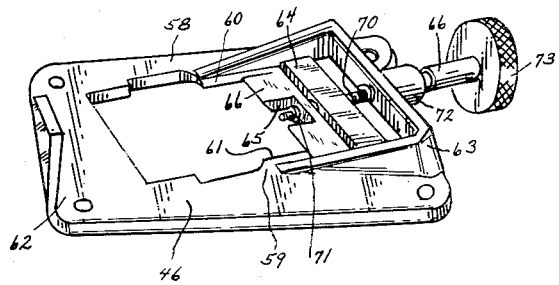
Figure 8 is a perspective view of the camera adaptor plate of the sight mount illustrated in Figures 1, 2, 3, 4 and 5, said plate removed from said mount.

The aircraft attachment plate 21 comprises a base 30 having extending flange portions 31, 32, 33, 34 and 35, clearly shown by Figure 7. Because of the needed location of the sight mount in the vicinity of many instruments sensitive to, or influenced by, magnetism or magnetic materials, the materials selected for this sight mount are a combination of aluminum, stainless steel of the non-magnetic grade and/or beryllium copper and other materials. Said materials are used according to structural requirements and space available. Where the flange portions 31, 32, 33, 34 and 35 of said attachment plate 21, as well as other portions, permit thicker structure, aluminum can be used. Where inherent space limitations dot not provide the necessary area or volume to permit the use of thicker structure to achieve a certain strength factor, non-magnetic stainless steel is used. Further, as in the case of the central pivoting and locking stud 36 of the mount and the bolt for attaching the sight mount to the gun sight 40, shown dotted in Figure 5, beryllium copper is used because of its high tensile strength, as well as its non-magnetic qualities.

The main attachment plate 21 is constructed with a plurality of holes 42 not needed for the passage of bolts, screws, etc.; said holes being provided for the purpose consistent with general aircraft practice, namely, reducing the weight of the mount while, at the same time, not materially reducing its strength or rigidity. The flange portions 31, 32, 33, 34 and 35 of plate 21 are provided with a plurality of cylindrical self-locking, threaded female members 45 which hold the sight mount in tight engagement and alignment with the desired adjacent aircraft surface, which is provided with a plurality of aligning holes through which bolts are passed into said female members 45.

Figure 2:
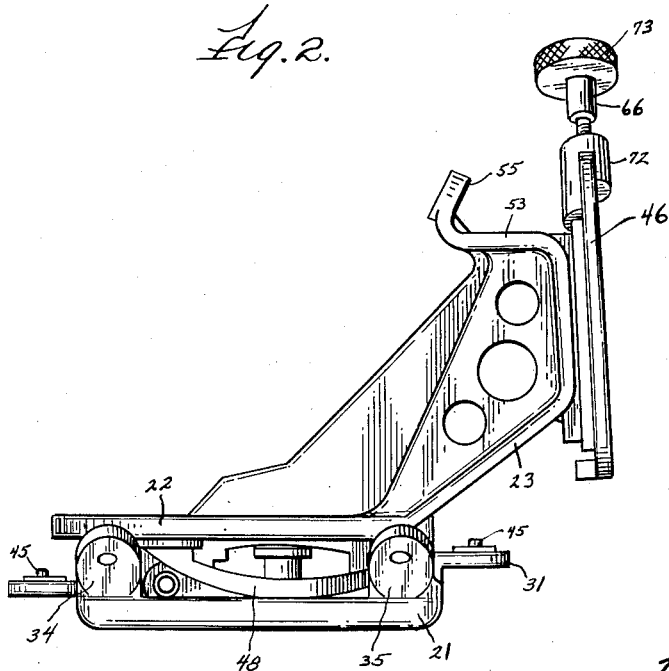
Figure 2 is a side elevational view of the sight mount illustrated in Figure 1.
Figure 6:
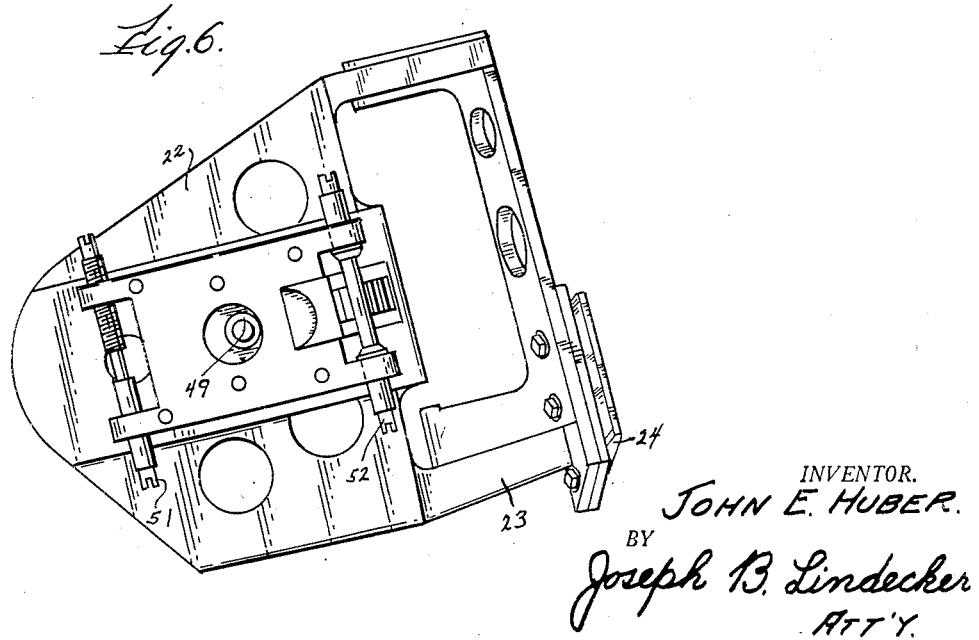
Figure 6 is a bottom perspective view of the gun sight mounting bracket of the sight mount illustrated in Figures 1, 2, 3, 4 and 5, said aircraft attachment plate removed from said mount.

Intervening between the base portion of the sight attachment bracket 22 and the aircraft attachment plate 21 are various parts which provide the azimuth and elevation adjustment, as well as the locking system which maintains the aircraft mount in adjustment once the harmonization has been effected. These parts are clearly shown by Figures 2 and 6. Said parts are not new in concept since same have been used in one form or another since 1943 by those skilled in the art, and the general contour of the rockers 48, the pivot 50, and parts associated therewith, may date back to the use of a bicycle saddle for securing and seating arrangement thereof. Adjusting shaft 51, which is screw-threaded, shaft 52, rack and pinion, and associated bearing parts, are shown by Figure 6.

In order to provide a new and novel wrap-around type of support, the gun sight bracket 22 is provided with the substantially vertical frame portion 23, the upper portion 23 being provided with two inwardly extending extensions 53 and 64, terminating in vertically formed stabilizing tabs 55 and 56. Said tabs 55 and 56 are provided with holes 68 and 69 respectively; as clearly shown by Figures 1, 2 and 5. The tabs 55 and 56 are secured to sight 40 by bolts 76 and 77; said bolts being shown dotted by Figure 5. Since the sight 40 is secured to bracket 22 by a bolt and to frame 23 by tabs 55 and 56, extensions 53 and 54 and bolts 76 and 77, the three constituents 22, 23 and sight 40 form a substantially solid unit, or supporting structure, for holding the camera in a rigid, vibrationless manner through the intermediation of mounting plate 24 and adaptor plate 46. It has been proven by numerous tests that, whenever the bolts 76 and 77 are not tightly secured to the sight 40 and tabs 55 and 56, the frame 23 is not absolutely rigid and free of vibration. It is clearly conceivable that the frame 23 must be held rigid in order that camera 55 remain rigid and free of vibration as desired, and this can only be accomplished by using the sight as an auxiliary supporting means in combinaton with bracket 22 and frame 23. Said bracket 22, frame 23, extensions 53 and 54, and tabs 55 and 56 form a wrap-around type structure.

The removable camera adaptor plate 46 is clearly shown by Figures 1, 2, 3, 4, 5 and 8. The plate is shown attached to a camera 55 by Figure 5; the camera being shown by dotted lines. Said adaptor plate 46 embodies side portions 58 and 59 and end portions 62 and 63 formed therewith. Each of the side portions 58 and 59 has surfaces 60 and 61 upon which is mounted a movable jaw 64. Said jaw 64 has a recess portion 65 and a gripping portion 66; said gripping portion 66 for clamping to the rectangular mounting plate 24 attached to the camera-supporting frame portion 23. Said plate 46 is shown removed from the camera, for purpose of illustration, in Figures 1, 2, 3, 4, 6 and 8. Associated with the plate 46, numeral 70 indicates a screw which is secured to the movable jaw 64 by locking pin 71. This screw 70 engages the internal threads of the enlarged base portion 72 of the end portion 63 forming part of plate 46. Secured to the outer end of screw 70 is the knurled thumb wheel 73 for operating the movement of said movable jaw 64. Said camera adaptor plate 46 is provided with four openings 75, so located in the corners of the plate for easy attachment of the plate 46 to the camera 55 by suitable attaching members.

It is clearly seen from the above that, from a design standpoint, it is necessary to use carefully selected materials. At the same time, considerable thought has to be given to the matter of approximating, as closely as possible, the center of the combined mass of the camera and the sight over the center of the adjusting system while yet staying within the limitations heretofore mentioned.

With the aircraft already designed, it has become necessary to follow the contours of the available mounting surfaces on the aircraft and to provide suitable attachment points which will coincide in sufficient quantity to attach the mount firmly and rigidly to the aircraft by bolts at various points on these surfaces. The angles of these various parts need to conform with the available surfaces within the aircraft.

Because it is necessary to separate the various portions of this sight mounting device in order to attach its attachment bracket to the sight itself, it then becomes necessary to dismantle the mount and reassemble it on the sight once it is received by the customer. Having done this, the sight is pointing in no particular direction, and, upon installation of the sight into the aircraft, it is necessary that the aircraft be aligned in a particular attitude coincident with the attiude used in firing the guns. The attitude of the sight and its associated camera must then be correlated in certain definite relationships with the various axes of the airplane. Once this attitude is achieved, the central locking stud 36 passing through the bottom of this assembly is securely tightened into its self-locking nut 49, which, in turn, prevents any lateral or vertical motion between the associated parts.

Since these sights are highly complex mechanisms, the need for adjustment in a laboratory or field-repair station is frequent. This, of course, necessitates the removal of the sight from the aircraft. If we were to remove the central pivoting stud of the sight mount assembly in order to permit the removal of the sight to an instrument laboratory, or such, and further, because of the inaccessibility of the sight attachment bolt due to circumstances mentioned above, it would again become necessary laboriously to align the aircraft with simulated targets, etc., and again harmonize the sight with the particular airplane when it is reinstalled on the aircraft. To obviate the need for this laborious process, the various points of attachment between the sight mount and the aircraft have been provided with self-locking nut plates on their top surfaces in extremely close alignment with each of the associated holes through this plate 21.

It will thus be seen that the sight mount shown and described can easily be installed, that a sight can be used with or without the camera and that the camera can be removed and replaced by a pilot during flight by the use of only one hand.

Thus, I have provided a camera and sight mount which attains the several objects hereinabove set forth in a thoroughly practical and sufficient manner.

As many possible embodiments may be made of the above invention, and as many changes may be made in the embodiment above set forth, it is to be understood that all matter hereinbefore set forth or shown in the accompanying drawings is to be interpreted as illustrative and not in a limiting sense.

I claim:

1. An aircraft-instrument mount for supporting a gun sight and a camera upon the surface of an aircraft shroud, comprising in combination: a sight; a camera; a mount embodying an attachment plate; a gun sight and camera-supporting bracket; means for attaching and aligning said mount to the airplane; means for attaching said sight to the base portion of said bracket; said bracket comprising a sight and a camera-supporting structure extending upwardly from its base portion; said structure provided with tabs which contact said sight when it is mounted upon said bracket; said tabs provided with apertures through which bolts are arranged for securing said tabs to said sight; and means arranged between said base member and said supporting bracket to provide the azimuth and elevation adjustment, as well as the locking system which will maintain the gun sight in adjustment once the harmonization has been effected.

2. An aircraft-instrument mount for supporting a gun sight and a camera upon the surface of an aircraft, comprising in combination: a sight; a camera; a mount embodying a mounting plate; a camera-supporting bracket; means for attaching the lower portion of said sight to the base portion of said bracket; said bracket comprising a sight and a camera-supporting structure extending upwardly from its base portion; means provided with the upwardly extending structure of said bracket for securing the upper portion of said sight to said structure; means provided with the upwardly extending structure of said bracket for securing and automatically aligning a camera with said gun sight when placed in contact with said supporting structure; and movable means for quickly releasing and relocking said camera without the use of tools when it is desirable to remove and replace said camera from the support.

3. An aircraft-instrument mount for supporting a gun sight and a camera upon an aircraft, comprising in combination: a sight; a camera; a mount embodying a mounting plate; a gun sight and camera-supporting bracket; means for attaching and aligning said mount to the airplane; means for attaching said sight to the base portion of said bracket; said bracket comprising a sight and a camera-supporting structure extending upwardly from its base portion; means provided with the upwardly extending portion of said structure for securing and automatically aligning a camera with said gun sight when placed in contact with said camera-supporting bracket; movable means for quickly releasing and relocking said camera without the use of tools when it is desirable to remove and replace said camera from the support; and means arranged between said base member and said supporting bracket to provide the azimuth and elevation adjustment, as well as the locking system which will maintain the gun sight in adjustment once the harmonization has been effected.

4. An aircraft-instrument mount for supporting a sight and a camera upon an aircraft, comprising in combination: a sight; a camera; a mount embodying a plate for attaching same to said aircraft; said mount comprising a sight-supporting bracket member arranged above said attaching plate; said sight bracket having means for securing a sight thereto; means arranged between said mounting member and said sight-supporting bracket to provide azimuth and elevation adjustment, as well as the locking system which will maintain the sight in adjustment once the harmonization has been effected; said sight-supporting bracket member provided with an upwardly extending sight and camera-supporting structure; tab-type means on said structure for bolting it to said sight; a camera mounting plate secured to said structure; an adaptor plate secured to said camera; said adaptor plate for attachment to said mounting plate; said adaptor plate embodying locking means for securing and accurately aligning a camera therewith; said locking means allowing quick removal and replacement of said camera; and means for retaining said accurately predetermined position when said camera and said adaptor plate are replaced on said mounting plate.

5. An aircraft-instrument mount for supporting a sight and a camera upon an aircraft shroud, comprising in combination: a sight; a camera; a mount embodying a mounting plate having a plurality of threaded female means and male means for attaching the plate to the aircraft; said mount comprising a sight-supporting bracket arranged above said mounting plate; said sight bracket having means for securing the lower portion of a sight thereto; means arranged between said mounting plate and said sight-supporting bracket to provide the azimuth and elevation adjustment, as well as the locking system which will maintain the sight in adjustment once the harmonization has been effected; said sight-supporting bracket provided with an upwardly extending sight and camera-supporting structure; said structure having tab-type means for securing the upper portion of a sight thereto; a camera mounting plate for attachment to said structure; a camera adaptor plate for attachment to said mounting plate; said adaptor plate embodying locking means for securing and accurately aligning a camera therewith; said camera adaptor plate comprising a pair of side guide portions, a fixed and movable jaw and a fixed end portion; means for operating the movable jaw, allowing quick removal and replacement of said adaptor plate with or without a camera thereon; and means for retaining said accurately predetermined position when said camera is replaced upon said mount.

6. In an aircraft mounting for a gun sight and a camera, comprising in combination: a sight; a camera; a mount embodying a base mounting plate; a sight and camera bracket movably mounted upon said mounting plate; means arranged between said base mounting plate and said sight and camera bracket to provide the azimuth and elevation adjustment, as well as the locking system which will maintain the gun sight in adjustment once the harmonization has been effected; a mounting plate for said camera; an adaptor plate for attachment to said mounting plate; said adaptor plate embodying locking means for securing and accurately aligning a camera therewith; said adaptor plate comprising a pair of side guide portions, a fixed and movable jaw and fixed end portions; means for operating the movable jaw, allowing quick removal and replacement of said camera secured to said adaptor plate; and means for retaining said accurately predetermined position when said camera is replaced upon said mounting plate.

7. An air-craft-instrument mount for supporting a gun sight and camera upon an aircraft, comprising in combination: a sight; a camera; a mount having a mounting base plate; means for attaching said mount to the airplane; a sight and camera-supporting bracket; said bracket comprising a sight and camera-supporting structure extending upwardly from its base portion, means for attaching said sight to the base portion of said bracket; means to attach said sight and said camera to said upwardly extending structure of said supporting bracket; and means arranged between said plate and said supporting bracket to provide the azimuth and elevation adjustment, as well as the locking system which will maintain the gun sight in adjustment once the harmonization has been effected.

8. An aircraft-instrument mount for supporting a gun sight and a camera upon the surface of an aircraft, comprising in combination: a sight; a camera; a mount having a mounting base member; means for attaching said mount to the airplane; a sight and camera-supporting bracket; said bracket comprising a sight and camera-supporting structure extending upwardly from its base portion; means for attaching said sight to the base portion of said bracket, means for attaching said sight and said camera to said upwardly extending structure of said bracket; and means arranged between said base member and said supporting bracket to provide the azimuth and elevation adjustment, as well as the locking system which will maintain the gun sight in adjustment once the harmonization has been effected.

9. An aircraft-instrument mount for supporting a gun sight and a camera upon the surface of an aircraft shroud, comprising in combination a sight; a camera; a mount having an attachment plate with a plurality of female members mounted thereon for use with suitable male members for securing said mount to said aircraft shroud; a sight and camera-supporting bracket having a bolt extending upwardly from its base portion for securing said gun sight to the base portion of said bracket; said bracket comprising a sight and camera-supporting structure extending upwardly from its base portion; means to attach said sight and said camera to the upper portion of said upwardly extending structure; and means arranged between said attachment plate and said bracket to provide the azimuth and elevation adjustment, as well as the locking system which will maintain the gun sight in adjustment once the harmonization has been effected.

References Cited in the file of this patent

UNITED STATES PATENTS 1,829,142    Hyden   ---------------- Oct. 27, 1931